INVENTOR.
RICHARD A. HUBER
BY Lindenberg + Freilich
ATTORNEYS

United States Patent Office 3,517,301
Patented June 23, 1970

3,517,301
REGULATED POWER SUPPLY
Richard A. Huber, Sherman Oaks, Calif., assignor to The Bunker-Ramo Corporation, Canoga Park, Calif., a corporation of Delaware
Filed Oct. 23, 1967, Ser. No. 677,412
Int. Cl. G05f 1/56, 1/64
U.S. Cl. 323—20                             3 Claims

ABSTRACT OF THE DISCLOSURE

A regulated power supply particularly suitable for use with a varying impedance load such as a xenon light source. The power supply includes a feedback loop responsive to load current for controlling DC voltage transformation by controlling the duty cycle of a power switch. In order to assure system stability, the duty cycle is also responsive to the rate of change of load voltage with circuit values being selected to yield a substantially constant system damping factor essentially independent of variations in load impedance.

BACKGROUND OF THE INVENTION

Field of the invention

This invention relates generally to electrical power supplies and, more particularly, to a regulated power supply suitable for use with a varying impedance load, such as a xenon light source.

Certain DC load devices, such as xenon light tubes, initially define a relatively high impedance and require a high voltage for starting and subsequently define a much lower impedance, requiring a regulated current to maintain them on. Conventional power supplies which meet the requirements of such load devices normally utilize power transformers or series regulators for DC voltage regulation or transformation. Such power transformers are usually very heavy and thus a xenon tube film projector weighing a total of 125 pounds may include a power supply weighing 100 pounds. On the other hand, power supplies using series dropping resistors for DC voltage transformation are very inefficient.

Description of the prior art

Some recently developed power supplies utilize duty cycle control of a power switch for performing DC voltage regulation. In such prior art circuits, a DC voltage is coupled to a load through a power switch. A feedback loop responsive to the load voltage controls the duty cycle of the power switch to establish a desired average DC potential across the load. Although such regulated power supplies to find utility, they are normally not sufficiently stable for use with varying impedance loads, such as xenon tubes, inasmuch as system damping in such supplies is very critical and dependent on load impedance.

In view of the foregoing, it is an object of the present invention to provide an efficient and stable lightweight power supply suitable for use with varying impedance loads such as xenon tubes.

SUMMARY OF THE INVENTION

Briefly, in accordance with the invention, a power supply is provided in which the coupling between a DC voltage source and a load is controlled in response to both load current and voltage.

More particularly, in a preferred embodiment of the invention, a DC voltage source is coupled to a load through a power switch which is either "on" (closed) or "off" (open). The duty cycle of the power switch determines the average DC voltage applied to the load. In accordance with a significant aspect of the invention the duty cycle is controlled by a feedback loop responsive to both load current magnitude and the rate of change of load voltage. By controlling the duty cycle in response to rate of change of voltage, system damping can be made substantially independent of load impedance variations thus allowing loop gain to be quite high (for accuracy and rapid response time) while still maintaining a good margin of stability.

DESCRIPTION OF THE DRAWING

The novel features of the invention are set forth with particularity in the appended claims. The invention will best be understood from the following description when read in conjunction with the accompanying drawings, in which:

Figure 1:
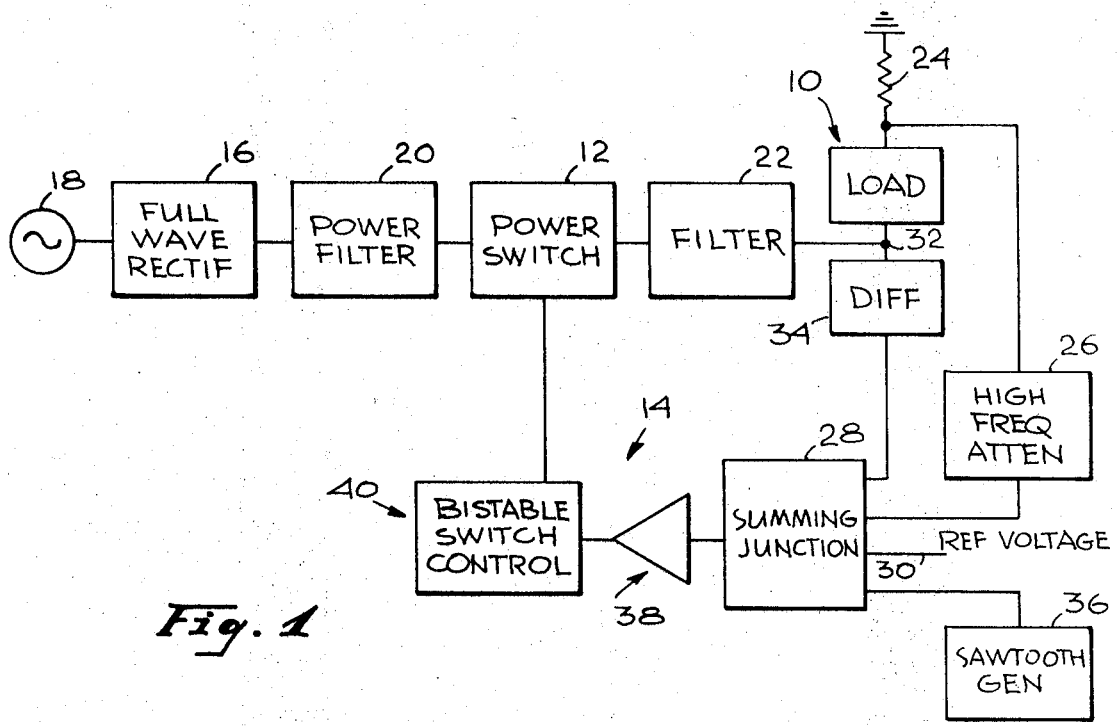
FIG. 1 is a block diagram of a power supply circuit constructed in accordance with the invention.

Attention is now called to FIG. 1, which illustrates a power supply circuit suitable for use with a varying impedance load 10, such as a xenon tube. Xenon tubes are often used in film projectors because they are more efficient and have better spectral characteristics than conventional filament light sources. Due to the heat generated by conventional filament light sources, the time duration that single film frames can be displayed is severely limited. In contrast, xenon light source projectors can display a single frame much longer. However, xenon light sources have the disadvantage of exhibiting a varying impedance; i.e., they define a relatively high impedance prior to starting and then a much lower impedance after starting. Thus, reasonably elaborate power control is required to provide a high voltage to start the xenon tube and then a regulated current to maintain it on. A power supply for automatically operating in this manner is illustrated in FIG. 1 and is basically comprised of a power switch 12 which couples a DC voltage to the load 10. The duty cycle of the power switch 12 is controlled by a feedback loop 14 responsive to both load voltage and current.

More particularly, in the system of FIG. 1, a full wave rectifier 16 is provided for developing a direct current voltage from an alternating current signal provided by a source 18. The direct current voltage provided by the rectifier 16 is applied through a power filter 20 to the power switch 12. The output of the power switch 12 is coupled to the load 10 through a high frequency filter 22.

A resistor 24 is connected in series with the load 10. The load current is monitored by sensing the voltage across the resistor 24 to develop a first control signal for application through a high frequency attenuation circuit 26 to a summing junction 28. A reference voltage is also applied to the summing junction 28 on terminal 30.

Additionally, the load voltage available at point 32 is differentiated by circuit 34 to supply a second control signal to the summing junction 28. Further, the output of a cyclic wave generator 36, e.g., a sawtooth generator, is also applied to the summing junction 28 and establishes the basic switching rate of switch 12. The output of the summing junction is coupled through an amplifier 38 to a bistable switch control 40, which in turn controls the state of the power switch 12.

In the operation of the circuit of FIG. 1, the rectifier 16 provides a full wave rectified signal to the power filter 20 which provides only rough smoothing; that is, the only requirement imposed on the power filter is that its output never fall below the minimum required load voltage. Final smoothing is provided by the current control feedback loop 14.

The voltage at the load, i.e., junction 32, will be a DC voltage whose value will be the average voltage at the output of the power switch 12. This average value will be directly related to the pulse width or duty cycle of the switch. When the switch is open, there will be no current through it, and, when it is closed, there will be no voltage across it. Hence, there will be no power dissipated by the switch, and therefore DC voltage transformation will be very efficient.

This basic frequency of the switch 12 should be relatively high, e.g., about 250 times greater than the frequency of the AC signal provided by source 18, i.e., about 15 kc. The high frequency filter 22 should have its upper cutoff set at about twenty times the power frequency or about 720 cycles to adequately filter out the harmonic components generated by the switch without significantly limiting the frequency response of the loop 14. The sawtooth wave provided by generator 36 establishes the basic switching rate of switch 12. The switch duty cycle is varied by the bias applied to the summing junction 28 from circuits 34 and 26. For example, with no bias, the sawtooth wave will be positive and negative for equal durations and thus the switch on-off times will be equal. By biasing the junction 28 to effectively increase the positive duration and decrease the negative duration of the signal applied to amplifier 38, the switch on time will be increased and the off time decreased.

On starting, the load 10 will present a high impedance so that the current through resistor 24 and the voltage thereacross will be low. As a consequence, the bias provided to the junction 28 through circuit 26 will be such as to provide a relatively long on time or duty cycle for switch 12 to thereby provide a high average DC voltage to junction 32. After starting the load impedance will increase so that the load current will tend to increase. As a consequence, the voltage across resistor 24 will increase, lowering the bias on the sawtooth wave and shortening the duty cycle to thus reduce the load voltage applied to point 32.

Thus, it will be appreciated that the load 10 initially defines a very high load impedance, which decreases to some much lower operating level. Because of this variation in load impedance it is virtually impossible to select filter and load values which yield a satisfactory system damping factor to assure stability. In order to achieve stability in the light of the load impedance variations, the circuit 34 is provided to differentiate the load voltage or, in other words, develop a signal representing a rate of change of load voltage which is applied to the summing junction 28. The relative gain of the differentiator circuit 34 is selected so that the damping provided by the rate feedback loop (i.e., differentiator 34) is much greater than the damping provided by the filter 22 and load 10. Accordingly, inasmuch as the damping provided by the rate feedback loop is independent of load impedance, system damping will remain substantially constant despite variations in load impedance. This permits the loop gain to be made quite high while still retaining satisfactory stability.

The high frequency attenuation or integral compensation network 26 allows the open loop gain to be made even higher if accuracy requirements demand, while still maintaining satisfactory stability. More particularly, in order to maintain stability, it is essential that the open loop gain be less than unity at a frequency which yields a 180° loop phase shift.

If the open loop gain were merely raised without some form of additional compensation, the frequency at which unity gain occurs will be increased without modifying the open loop phase characteristic to thereby degrade stability. The network 26 provides this compensation by attenuating the higher frequencies without affecting the high frequency open loop phase characteristic.

Figure 2:
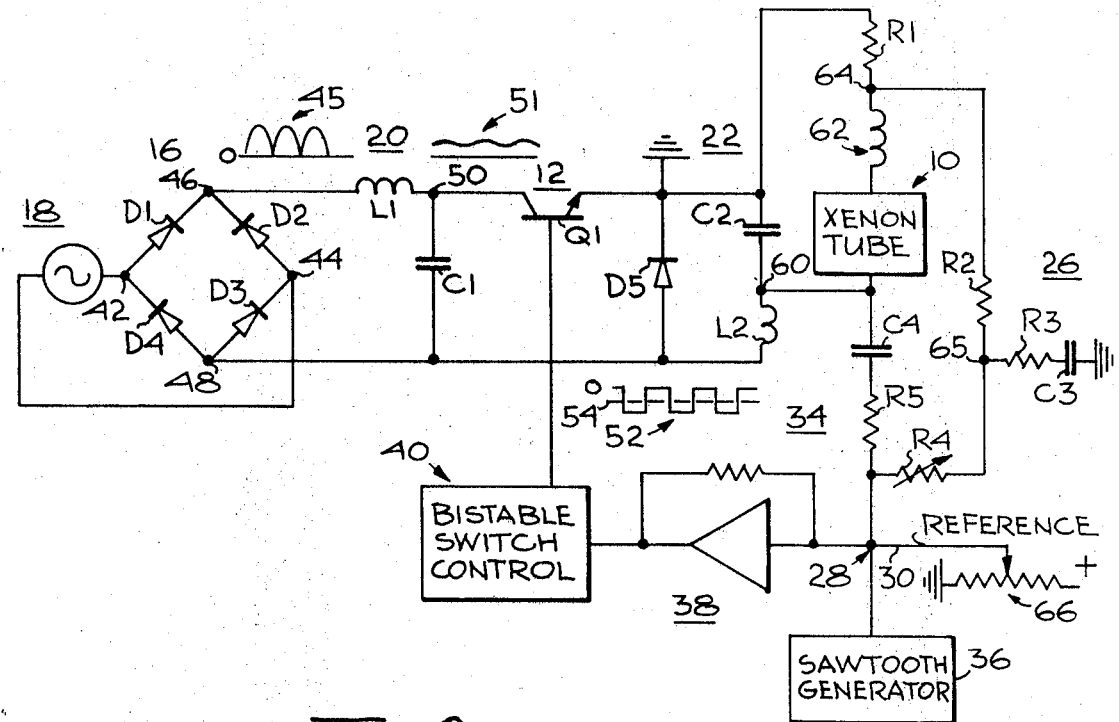
FIG. 2 is a schematic diagram of a preferred embodiment of the invention.

Attention is now called to FIG. 2 which illustrates a schematic diagram of the embodiment shown in block diagram form in FIG. 1. FIG. 2 illustrates the rectifier 16 as being comprised of diodes D1 and D2, D3 and D4 connected in a full wave rectifier configuration. The AC source 18 is connected between junction 42, between diodes D1 and D4, and a junction 44, between diodes D2 and D3. The rectifier 16 provides the signal 45 illustrated in FIG. 2.

The junction 46 between diodes D1 and D2 is connected through an inductor L1 of the power filter 20 to a junction 50. Capacitor C1 of the power filter 20 is connected between junction 50 and junction 48, between diodes D3 and D4. The voltage across the capacitor C1 will build to approximately 100 volts DC and is represented in FIG. 2 by the waveform 51.

The junction 50 is connected to the power switch 12, which comprises an NPN transistor Q1. More particularly, the junction 50 is connected to the collector of transistor Q1. The emitter of transistor Q1 is defined as the system reference ground and is connected to the cathode of a diode D5 of the high frequency filter 22. The base of transistor Q1 is connected to the bistable switch control 40, which constitutes a switching amplifier which turns the switch either fully on or fully off.

The lower terminal of capacitor C1 is connected to the anode of diode D5. Connected in parallel with the diode D5 is a series circuit branch comprised of inductor L2 and capacitor C2. The substantially square wave signal 52 shown in FIG. 2 is provided at the anode of diode D5. Diode D5 clamps the positive excursions of signal 52 to a zero volt level.

The values of capacitor C2 and inductor L2 are chosen so that the upper cutoff frequency of the filter 22 is approximately 720 cycles so that any harmonics of the switching rate of switch 12 are sharply attenuated. The DC component 54 of the average voltage of signal 52 existing at the anode of diode D5 will also exist at the junction 60 between capacitor C2 and inductor L2. The voltage at junction 60 will be free of ripple current and will have an average value dependent upon the duty cycle or pulse width on-time of the power switch 12.

The junction 60 is connected to the load or xenon tube 10. A transformer secondary 62 which can provide a high potential to ignite the tube 10 is connected in series therewith. Also connected in series with the load 10 is a resistor R1 which, in turn, is connected to ground.

The junction 64 between the resistor R1 and transformer secondary 62 is connected through resistor R2 and variable resistor R4 to the summing junction 28. The junction 65 between resistors R2 and R4 is connected through resistor R3 and capacitor C3 connected to ground. Resistors R2, R3, and capacitor C3 constitute the high frequency attenuation or integral compensation network 26 of FIG. 1. The variable resistor R4 establishes the relative gain exhibited to the voltage signal available at the junction 64, which, of course, constitutes a measure of load current. The signal applied to the junction 28 through resistor R4 is effectively compared with a reference signal derived on line 30 from a potentiometer 66. The output of the sawtooth wave generator 36 is also applied to the junction 28.

The summing junction 28 is connected to the input of an operational amplifier 38 whose output controls the bistable switch control amplifier 40.

In addition to the input signal to the junction 28 from point 64 representing load current, a signal indicative of a load voltage characteristic at junction 60 is also applied to the summing junction 28. More particularly, the rate of change of load voltage available at junction 60 is applied through a differentiator circuit 34 comprised of capacitor C4 and resistor R5 connected in series.

Considering the operation of the circuit shown in FIG. 2, initially disregard the feedback path from junction 60 to the summing junction 28. When the load impedance is high so that the load current is relatively small, a small negative potential will exist at junction 64 so that the sum of the signals provided by resistor R4 and potentiometer 66 at junction 28 will be relatively high. Thus, the operational amplifier output will be positive for a greater percentage of its cycle to define a relatively long switch duty cycle. When the load impedance decreases, the load current will tend to increase to thus make the potential at junction 64 more negative to in turn shorten the duty cycle.

In the absence of the feedback path from junction 60 to junction 28, system damping would essentially be proportional to a damping factor $L2/R_L$; i.e., the ratio between the inductance of filter 22 to the load resistance. Inasmuch as $R_L$ could vary from essentially an open circuit condition down to approximately one-half ohm, it is virtually impossible to critically damp the system. By incorporating the feedback path from junction 60 to junction 28, system damping will be substantially proportional to two damping factor components; i.e., $(L2/R_L+K)$ where K represents the gain of this feedback path. By making K large compared to $L2/R_L$, system damping will be substantially constant and independent of load impedance variations. For example, in the preferred embodiment, L2 and K are chosen so that the value of K is approximately 30 times greater than the maximum value of $L2/R_L$. Thus, the damping factor which is proportional to $(L2/R_L+K)$ will vary by no more than 3% over the possible range of $R_L$.

From the foregoing, it will be appreciated that a stable power supply circuit has been shown herein which is capable of operating with varying impedance loads and which performs DC voltage regulation without using heavy power transformers or inefficient dropping resistors. It will, of course, be recognized that various modifications and equivalents will readily occur to those skilled in the art and it is therefore intended that such be covered by the appended claims.

The embodiments of the invention in which an exclusive property or privilege is claimed are defined as follows:

1. Regulation means for use with a varying impedance load, said regulation means comprising:

a switch means capable of selectively defining open and closed states for coupling a source of electrical energy to said load;

first feedback means responsive to characteristics of current through said load for providing a first control signal;

second feedback means including a differentiator circuit for providing a second control signal indicative of the rate of change of voltage across said load;

timing generator means providing a cyclic signal;

summation means responsive to said first and second control signals and said cyclic signal for developing a summation signal; and controlling means responsive to said summation signal for controlling the respective durations of said open and closed states.

2. The regulation means of claim 1 wherein a first system damping factor component is at least partially defined by said load with the value thereof being dependent on the impedance value of said load and wherein a second system damping factor component is defined by the characteristics of said second feedback means with the value thereof being substantially independent of the impedance value of said load.

3. The regulation means of claim 2 wherein the value of said second system damping factor component is much larger than the value of said first system damping factor component for all possible values of said load impedance.

References Cited

UNITED STATES PATENTS

| 2,866,151 | 12/1958 | Applin et al. | 323—39 X |
| 3,350,628 | 10/1967 | Gallagher et al. | 323—4 |
| 3,356,930 | 12/1967 | Lupoli et al. | 323—20 |

J D MILLER, Primary Examiner

A. D. PELLINEN, Assistant Examiner

U.S. Cl. X.R.

321—18; 323—39